United States Patent
Makishima et al.

(10) Patent No.: US 9,185,018 B2
(45) Date of Patent: Nov. 10, 2015

(54) PATH DIAGNOSIS IN COMMUNICATION NETWORKS

(75) Inventors: Dennis Makishima, Mountain View, CA (US); Vidya Renganarayanan, Sunnyvale, CA (US); Anil Kumar Chintalapati, Sunnyvale, CA (US); Sathish K. Gnanasekaran, Sunnyvale, CA (US); Daniel Ji Young Park Chung, San Jose, CA (US); Vidya Sagar Ravipati, San Jose, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 697 days.

(21) Appl. No.: 13/179,308

(22) Filed: Jul. 8, 2011

(65) Prior Publication Data

US 2012/0099443 A1 Apr. 26, 2012

Related U.S. Application Data

(60) Provisional application No. 61/405,925, filed on Oct. 22, 2010.

(51) Int. Cl.
*H04L 12/26* (2006.01)

(52) U.S. Cl.
CPC ............ *H04L 43/10* (2013.01); *H04L 43/0811* (2013.01)

(58) Field of Classification Search
CPC ........................................................ H04L 12/26
USPC ........................................................ 370/248
See application file for complete search history.

(56) References Cited

U.S. PATENT DOCUMENTS

| | | | | |
|---|---|---|---|---|
| 5,434,863 A * | 7/1995 | Onishi et al. | ................... | 370/402 |
| 6,115,362 A * | 9/2000 | Bosa et al. | ...................... | 370/248 |
| 6,490,292 B1* | 12/2002 | Matsuzawa | ........... | H04L 49/251 |
| | | | | 370/395.1 |
| 7,102,996 B1* | 9/2006 | Amdahl et al. | ................ | 370/230 |
| 7,406,034 B1* | 7/2008 | Cometto et al. | .............. | 370/218 |
| 7,502,354 B1* | 3/2009 | Maufer | ......................... | 370/338 |
| 7,583,589 B2* | 9/2009 | Bryant et al. | ................. | 370/216 |
| 7,656,812 B2* | 2/2010 | Tadimeti et al. | .............. | 370/248 |
| 7,958,271 B2* | 6/2011 | Zou et al. | ...................... | 709/249 |
| 8,488,609 B2* | 7/2013 | Masputra et al. | ............. | 370/392 |
| 2004/0100983 A1* | 5/2004 | Suzuki | ......................... | 370/432 |
| 2004/0225725 A1* | 11/2004 | Enomoto et al. | ............. | 709/220 |
| 2005/0047353 A1* | 3/2005 | Hares | ............................ | 370/255 |
| 2005/0117522 A1* | 6/2005 | Basavaiah et al. | ............ | 370/252 |
| 2006/0087974 A1* | 4/2006 | Ozer et al. | .................... | 370/235 |
| 2006/0109815 A1* | 5/2006 | Ozer et al. | .................... | 370/329 |
| 2006/0227779 A1* | 10/2006 | Shimizu | ........................ | 370/389 |
| 2007/0254675 A1* | 11/2007 | Zorlu Ozer et al. | ......... | 455/456.2 |
| 2008/0268855 A1* | 10/2008 | Hanuni et al. | ................ | 455/445 |
| 2008/0298251 A1* | 12/2008 | Khuu | .................... | H04L 45/125 |
| | | | | 370/238 |
| 2009/0201898 A1* | 8/2009 | Gong et al. | ................... | 370/338 |
| 2009/0232119 A1* | 9/2009 | Seok | ............................. | 370/338 |
| 2011/0280245 A1* | 11/2011 | Ghosh | ................ | H04L 12/4633 |
| | | | | 370/392 |
| 2012/0163164 A1* | 6/2012 | Terry | ..................... | H04L 45/24 |
| | | | | 370/221 |

* cited by examiner

*Primary Examiner* — Guang Li
(74) *Attorney, Agent, or Firm* — Shun Yao; Park, Vaughan, Fleming & Dowler LLP

(57) ABSTRACT

One embodiment of the present invention provides a system for mapping all possible paths between a source node and a destination node. During operation, the system receives a management frame, determines all possible next-hop nodes based on a destination address carried in the payload of the management frame. The system then selects one of the next-hop nodes, and modifies payload of the received management frame to include information associated with the next-hop nodes and the selected next-hop node. The system then forwards the modified data frame to the selected next-hop node.

20 Claims, 6 Drawing Sheets fcping –allpaths [-printisl] [-covcount <N>] [-maxTries <M>] [-delay <D>] [-errstats] [-vc] <PID|WWN|Domain>

```
Neptune80: FID128: root> fcping –allpaths 3
Pinging (size:12 bytes) destination domain 3 through all paths

PATH    SWITCH1→            SWITCH2→            SWITCH3→            STATUS 1     (32/EMB, 32/1) [128]   (42/348, 42/34) [128]    (3/0, 3/EMB) [128]    SUCCESS 2     (32/EMB, 32/1) [128]   (42/348, 42/217) [128]   (3/4, 3/EMB) [128]    SUCCESS 3     (32/EMB, 32/2) [128]   (42/38, 42/34) [128]     (3/0, 3/EMB) [128]    SUCCESS 4     (32/EMB, 32/2) [128]   (42/38, 42/217) [128]    (3/4, 3/EMB) [128]    SUCCESS
```

FIG. 5C

```
Neptune80: FID128: root> fcping –allpaths -covcount 1000 -maxTries 5000 -printisl 3
Pinging (size:12 bytes) destination domain 3 through all paths PATH    SWITCH1→            SWITCH2→            SWITCH3→            STATUS
  1     (32/EMB, 32/1) [128]   (42/348, 42/34) [128]    (3/0, 3/EMB) [128]    SUCCESS
  2     (32/EMB, 32/1) [128]   (42/348, 42/217) [128]   (3/4, 3/EMB) [128]    SUCCESS
  3     (32/EMB, 32/2) [128]   (42/38, 42/34) [128]     (3/0, 3/EMB) [128]    SUCCESS
  4     (32/EMB, 32/2) [128]   (42/38, 42/217) [128]    (3/4, 3/EMB) [128]    SUCCESS Successfully completed superping for all paths ISL COVERAGE
SNO     ISL                             STATUS
  1     (32/1 [128] → 42/38 [128])      SUCCESS(1000/1000)
  2     (32/2 [128] → 42/38 [128])      SUCCESS (1000/1000)
  3     (42/34 [128] → 3/0 [128])       SUCCESS(988/988)
  4     (42/217 [128] → 3/4 [128])      SUCCESS (1012/1012)

INTERNAL PORT COVERAGE
SNO     DOMAIN      INTRNL_POR      STATUS
  1       42          10/0          SUCCESS(244/244)
  2       42          10/1          SUCCESS (0/0)
  3       42          10/4          SUCCESS(222/222)
  4       42          10/6          SUCCESS (0/0)
  5       42          10/8          SUCCESS(276/276)
  6       42          10/10         SUCCESS (0/0)
  7       42          10/12         SUCCESS(268/268)
  8       42          10/13         SUCCESS (0/0)
```

FIG. 5D

PATH DIAGNOSIS IN COMMUNICATION NETWORKS

RELATED APPLICATIONS

This application claims the benefit of U.S. Provisional Application No. 61/405,925, entitled "SUPERPING," by inventors Dennis Makishima, Vidya Renganarayanan, Anil Kumar Chintalapati, Sathish K. Gnanasekaran, Daniel Ji Young Park Chung, and Vidya Sagar Ravipati, filed 22 Oct. 2010, the disclosures of which are incorporated by reference herein.

BACKGROUND

1. Field

The present disclosure relates to network monitoring and troubleshooting. More specifically, the present disclosure relates to a system and method for detecting faults in data paths in a communication network.

2. Related Art

As more mission-critical applications are being implemented in data communication networks, high-availability operation is becoming progressively more important for network architects. It is often desirable to have a diagnostic tool that can detect and identify a failure point within the network. In the past, various types of mechanisms have been implemented to monitor, diagnose, and troubleshoot networks. For example, in a Fibre Channel (FC) network, an extended link services (ELS) frame, such as an Echo frame, can be used to test link connectivity. Similarly, in an Internet Protocol (IP) network, a host can "ping" another node to test the connectivity between these two nodes.

However, these current network diagnostic tools do not always meet the demands of a complex network. More specifically, when multiple paths exist between two nodes, the Echo or ping function cannot provide detailed information of all possible paths.

SUMMARY

One embodiment of the present invention provides a system for mapping all possible paths between a source node and a destination node. During operation, a source device sends a data frame destined to an end-node through one of the multiple paths in a network. Subsequently, a management frame carrying routing information of the data frame in its payload is sent hop-by-hop to the same destination node, which facilitates determination of all possible next-hop nodes for all the intermediate nodes. The payload of the management frame is modified along the way to include information associated with the next-hop nodes. An intermediate node selects one of the possible next-hop nodes, and forwards the modified management frame to the selected next-hop node.

In a variation on this embodiment, the system selects the next-hop node based on at least one of: a source address of the received data frame, a destination address of the received data frame, a port at which the received data frame is received, and an exchange identifier of the received data frame.

In a variation on this embodiment, a respective next-hop node is a Fibre Channel (FC) switch.

In a further variation, the management frame corresponds to an FC Echo frame. In addition, the payload of the management frame includes header information of the FC Echo frame.

In a variation on this embodiment, the system further receives a response frame corresponding to the management frame. The response frame is generated by the destination node specified in the payload of the management frame and destined to the source node specified in the payload of the management frame.

In a further variation, the response frame includes a copy of the payload of the modified management frame, thereby allowing the source node to obtain the information associated with the next-hop nodes.

In a variation on this embodiment, the system further receives a plurality of subsequent management frames from the same source node and a plurality of response frames. A respective response frame corresponds to a respective management frame.

In a further variation, responsive to a response frame corresponding to a particular data frame being received at the source node, the system increments a success count for all links traversed by the particular data frame.

In a variation on this embodiment, the management frame corresponds to a virtual channel (VC).

BRIEF DESCRIPTION OF THE FIGURES

FIG. 5C illustrates an exemplary screenshot showing an FCPing command executed for the topology shown in FIG. 5B with the "allpaths" option and the displayed output, in accordance with an embodiment of the present invention.

FIG. 5D illustrates an exemplary screenshot showing an FCPing command with other options in conjunction with the "allpaths" option and the displayed result, in accordance with an embodiment of the present invention.

In the figures, like reference numerals refer to the same figure elements.

DETAILED DESCRIPTION

Figure 1:
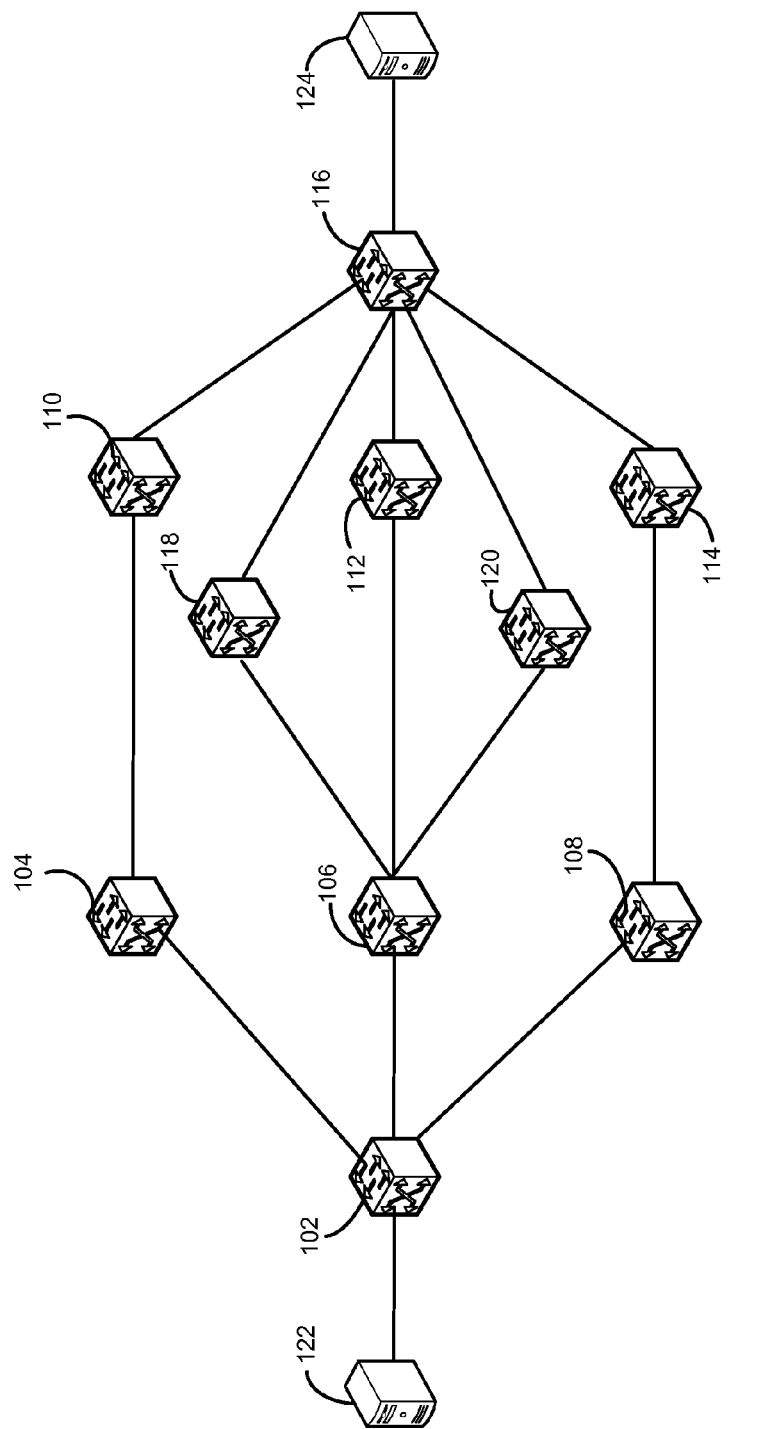
FIG. 1 illustrates an exemplary multi-path scenario in a Fibre Channel (FC) network.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of detecting faults in multiple data paths between two nodes is solved by transmitting from the source node link-test request frames via all possible next-hop nodes of all possible data paths. An intermediate node receiving the link-test request frame selects one of the available multiple paths to the destination, based on parameters carried in the link-test request frame header. When the destination receives the frame, it sends a response directly to the source node. Subsequently, the source node sends a management frame which carries the same parameters as the previously sent link-test request frame in its payload. Each node along the data path modifies payload of the management frame to include information associated with its own next-hop nodes and the actual next-hop node taken by the management frame. This way, when the management frame reaches the destination, its payload would contain sufficient information (e.g., a tree-like data structure representing datapaths) about a number of candidate data paths and information on the actual data path taken. The destination node then copies the payload into a response management frame, and sends the response management frame back to the source node. By repeating this request-response process along all links traversed by the corresponding link-test frames, the source node can obtain statistics for all possible paths between source node and destination node. In some embodiments, this request-response process can be performed on all possible virtual channels (VCs) on all inter-switch links (ISLs) in order to obtain connectivity information for each VC.

Although the present disclosure is presented using examples based on a Fibre Channel (FC) network, embodiments of the present invention are not limited to FC networks, or networks defined in a particular Open System Interconnection Reference Model (OSI reference model) layer.

The terms "frame" or "packet" refer to a group of bits that can be transported together across a network. "Frame" should not be interpreted as limiting embodiments of the present invention to layer-2 networks. "Packet" should not be interpreted as limiting embodiments of the present invention to layer-3 networks. "Frame" or "packet" can be replaced by other terminologies referring to a group of bits, such as "cell" or "datagram."

SuperPing in a FC Network

FIG. 1 illustrates an exemplary multi-path scenario in a Fibre Channel (FC) network. As illustrated in FIG. 1, an FC network 100 includes a number of switches 102, 104, 106, 108, 110, 112, 114, 116, 118, and 120, a host device 122, and a target device 124. Host device 122 is coupled to switch 102, and target device 124 is coupled to switch 116. Multiple data paths exist between host device 122 and target device 124. For example, a frame can travel from host device 122 to target device 124 via switches 102, 104, 110, and 116; or via switches 102, 106, 112, and 116.

In a conventional FC network, to test connectivity between host device 122 and target device 124, host device 122 sends a number of Echo frames to target device 124. Once target device 124 receives an Echo frame, it responds by sending an LS_ACC frame back to host device 122, copying the payload from the received Echo frame. The successful receipt of the LS_ACC frame by host device 122 indicates that at least one data path between host device 122 and target device 124 is operational. However, this process does not provide sufficient information about all possible data paths between host device 122 and target device 124, which path the Echo frame takes, or whether one or more of the data paths experience a failure. For example, among all possible paths, if one of them experiences failure, then the Echo frames taking this particular path will not reach target device 124, which in turn will fail to send the response frames corresponding to these Echo frames to host device 122. Although host device 122 observes that certain number of Echo frames do not generate a response, host device 122 has no way of knowing which path has failed.

In order to obtain a complete diagnosis of all possible data paths between host device 122 and target device 124, embodiments of the present invention implement a "SuperPing" function that tests all ISLs and internal links in all possible paths between a source device and a target device. To do so, each switch in all paths tracks the path taken by an Echo frame sent to a downstream device and obtains the path information by sending a management frame that carries the same routing information as the Echo frame in its payload.

In the example shown in FIG. 1, during the operation of SuperPing, source switch 102 (the switch immediately coupled to host device 122) sends a plurality of Echo frames destined to target device 124. In one embodiment, the Echo frames are sent out one by one (i.e., a subsequent Echo frame is sent out after a response to a previous Echo frame is received). Because there are multiple paths, the forwarding mechanism of each switch can forward a received Echo frame to one of its output ports corresponding to different paths based on a number of factors. In one embodiment, when there are multiple downstream paths (and hence multiple output ports for forwarding the Echo frame), the forwarding mechanism selects an output port for a received Echo frame by calculating a hash function using the receiving port number, the source identifier (S_ID), the destination identifier (D_ID), and the originator exchange identifier (OX_ID). Note that the Echo frames from the same source switch to the same destination switch have the same S_ID and the same D_ID. Hence, the receiving input port and OX_ID determine the path to the destination taken by an Echo frame. In the example shown in FIG. 1, an Echo frame sent by source switch 102 to destination switch 116 may be forwarded to switch 104, switch 106, or switch 108. Note that other methods for selecting an output port can also be used.

When an intermediate switch, such as switch 106, receives the Echo frame, its forwarding mechanism forwards the Echo frame to its next-hop switch using a similar algorithm. For example, the forwarding mechanism of switch 106 calculates a hash function based on the receiving port number, the S_ID, the D_ID, and the OX_ID of the received Echo frame to determine its output port. This process is repeated at each intermediate switch until the Echo frame reaches destination switch 116, which has one output port coupled to target device 124. The target device sends an LS_ACC response to source device using the same algorithm. Following this step, the source switch sends out a management frame with the same SID, DID, receiving port number of next hop and the OX_ID as the Echo frame in its payload. The payload also includes a list of all next hops corresponding to the current node and the actual next hop to which the Echo frame (and, correspondingly, the management frame) is sent. When an intermediate switch receives the management frame, the intermediate switch also adds its routing information to the payload of the management frame. The routing information includes all available output ports on the intermediate switch as well as the actual path (output port) this management frame (as well as the previously sent Echo frame) takes. For example, switch 106 may add to the management frame information associated with its three output ports, as well as information that indicates this management frame is transmitted via the output port coupled to switch 112.

This process is repeated at each intermediate switch until the management frame reaches destination switch 116, which has one output port coupled to target device 124. Upon receiving the management frame, destination switch 116 sends a response management frame, with the collected payload, back to source switch 102. The payload of the response management frame is copied from the payload of the received management frame. Note that now the response management frame includes routing information at each intermediate switch. In addition, the routing information includes not only the actual path the management frame (as well as the previously sent Echo frame) takes, but also possible path information at each intermediate switch. Therefore, when source switch 102 receives the response management frame, it can identify the actual path the Echo data frame takes and determine whether there are other possible paths. For example, if the Echo frame takes the path from switch 102 to switch 116 via switches 106 and 112, the response management frame will include the exact path information along with alternative path information provided by switch 106 (which indicates that possible next-hop switches from switch 106 also include switches 118 and 120). In one embodiment, each time source switch 102 receives a response management frame corresponding to an Echo frame, it increments a success count for all ISLs traversed by the Echo frame.

To map out all possible paths between source switch 102 and destination switch 116, source switch 102 needs to send more than one Echo frame (and the corresponding management frame) to destination switch 116, each having a different OX_ID. (Note that the subsequent management frame payload has the same OX_ID as the corresponding Echo frame.) The different OX_IDs ensure that different Echo frames are forwarded to different paths. Consequently, as long as a sufficient number of Echo frames are sent, all possible paths between source switch 102 and destination switch 116 can be traversed. In one embodiment, source switch 102 maintains a table that tracks possible paths reported by each intermediate switch (via the response frame). Based on this table, source switch 102 can determine when all possible paths have been traversed.

Figure 2:
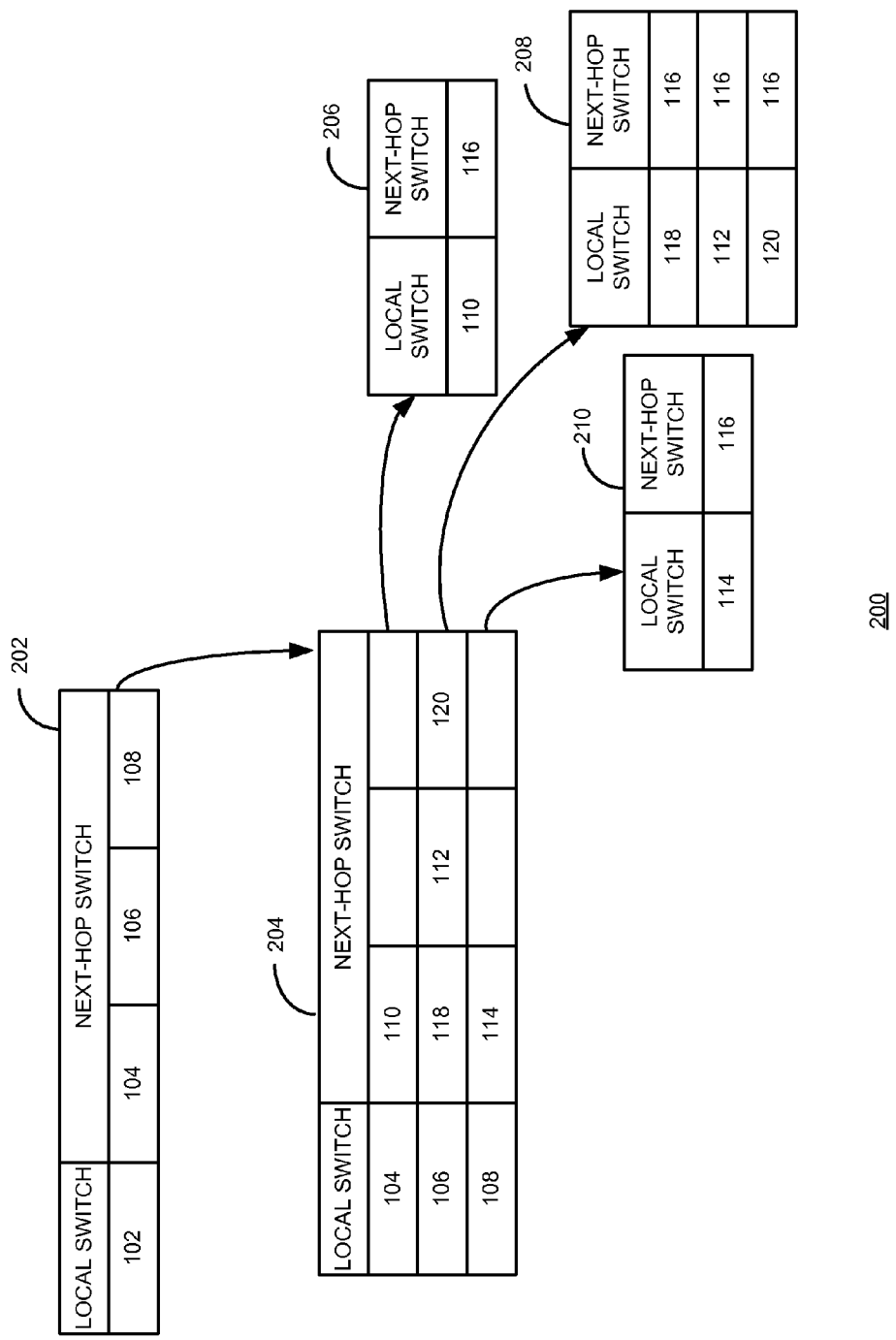
FIG. 2 presents a diagram illustrating an exemplary table mapping possible paths between a source switch and a destination switch, in accordance with an embodiment of the present invention.

FIG. 2 presents a diagram illustrating an exemplary table mapping possible paths between source switch 102 and destination switch 116 in the example shown in FIG. 1, in accordance with an embodiment of the present invention. Table 200 includes a number of sub-tables, including a first-hop table 202, a second-hop table 204, and a number of third-hop tables 206, 208, and 210.

First-hop table 202 lists all possible next-hop switches from source switch 102 en route to destination switch 116, including switches 104, 106, and 108. Note that this information is known to source switch 102. Second-hop table 204 lists all possible next-hop switches for the switches listed in first-hop table 202. Each row in second-hop table 204 corresponds to a next-hop switch included in first-hop table 202. For example, the middle row in second-hop table 204 corresponds to switch 106, and includes all possible next-hop switches from switch 106, such as switches 118, 112, and 120. This information can be obtained by source switch 102 from the response management frames that pass through switch 106. When a management frame (corresponding to a previously sent Echo frame) passes through switch 106, switch 106 adds information that lists all its next-hop switches to the payload of the management frame. This enhanced payload is then copied to the response management frame by destination switch 116, and sent back to source switch 102. Similarly, the next-hop information for switches 104 and 108 is obtained from response management frames passing through switches 104 and 108, respectively.

Third-hop tables 206, 208, and 210 list all possible next-hop switches for each next-hop switch included in second-hop table 204. Each third-hop table corresponds to a row in second-hop table 204, and each row in a third-hop table corresponds to a next-hop switch in second-hop table 204. For example, third-hop table 208 corresponds to the middle row of second-hop table 204, and the top row in third-hop table 208 corresponds to output switch 118 in the middle row in second-hop table 204. Similarly, third-hop table 206, which includes only one row, corresponds to the top row of second-hop table 204, which lists only one next-hop switch (switch 110) for switch 104. Third-hop table 206 indicates that the next-hop switch from switch 110 is destination switch 116. Similarly to second-hop table 204, information included in third-hop tables 206-210 is obtained by source switch 102 from the response frames that pass through the next-hop switches listed in second-hop table 204. For example, the next-hop information for switch 110 is obtained by a response management frame that passes through switch 110. No further expansion of third-hop tables 206-210 is needed because all next-hop switches listed in these tables show destination switch 116, indicating that the end of the path has been reached. Note that other than tables, the source switch can maintain the mapping of possible paths in other formats, such as a tree diagram.

The data structure in FIG. 2 identifies all possible paths between source switch 102 and destination switch 116, thus providing sufficient information to source switch 102 to determine whether all paths have been traversed. For example, first-hop table 202 lists possible next-hop switches from source switch 102, including switches 104-108. Hence, as long as one of the switches 104-108 has not been traversed, the system continues transmitting Echo frames, following which the management frames will collect the statistics. Similarly, second-hop table 204 lists all next-hop switches from switch 106.

Hence, as long as one of switches 118, 112, and 120 has not been traversed as the next-hop switch from switch 106, the system will continue to transmit Echo frames.

When one or more ISLs fails along a path (i.e., when an Echo frame sent along the path is dropped), source switch 102 will not receive a response frame corresponding to an Echo frame sent on this path. In one embodiment, a timer is set when source switch 102 sends out an Echo frame, and if the response to that Echo frame is not received by source switch 102 before the timer expires, the Echo frame is considered to have been dropped. Consequently, all upstream ISLs along the path will be associated with a failure (with a failure count incremented by 1). It can be difficult to determine the exact ISL that drops the Echo. However, by examining the error statistics for a large number of Echo frames, one can identify the faulty ISL as the one having the largest percentage of failures, because any path through this failed ISL will cause the Echo frame to be dropped, thus accumulating a higher failure percentage. In order to obtain error statistics on all ISLs, a relatively large number of Echo frames are sent from the source switch to the destination switch to ensure that each possible ISL is traversed by multiple Echo frames. In one embodiment, if not all paths have been traversed after a predetermined number of Echo frames have been sent, the system notifies the user so that the user can increase the number of Echo frames that are sent.

In the example shown in FIG. 1, if an Echo frame along the path of switches 102-106-112-116 is dropped, then all ISLs along this path (including the ISLs between switches 102 and 106, the ISL between switches 106 and 112, and the ISL between switches 112 and 116) are marked as experiencing failure. However, among all Echo frames passing through the ISL between switches 102 and 106, only a small percentage of frames are dropped, whereas all Echo frames passing through the ISLs between switches 106 and 112 and between switches 112 and 116 are dropped. Evidently, the faulty ISL is located between switches 106 and 116.

Figure 3:
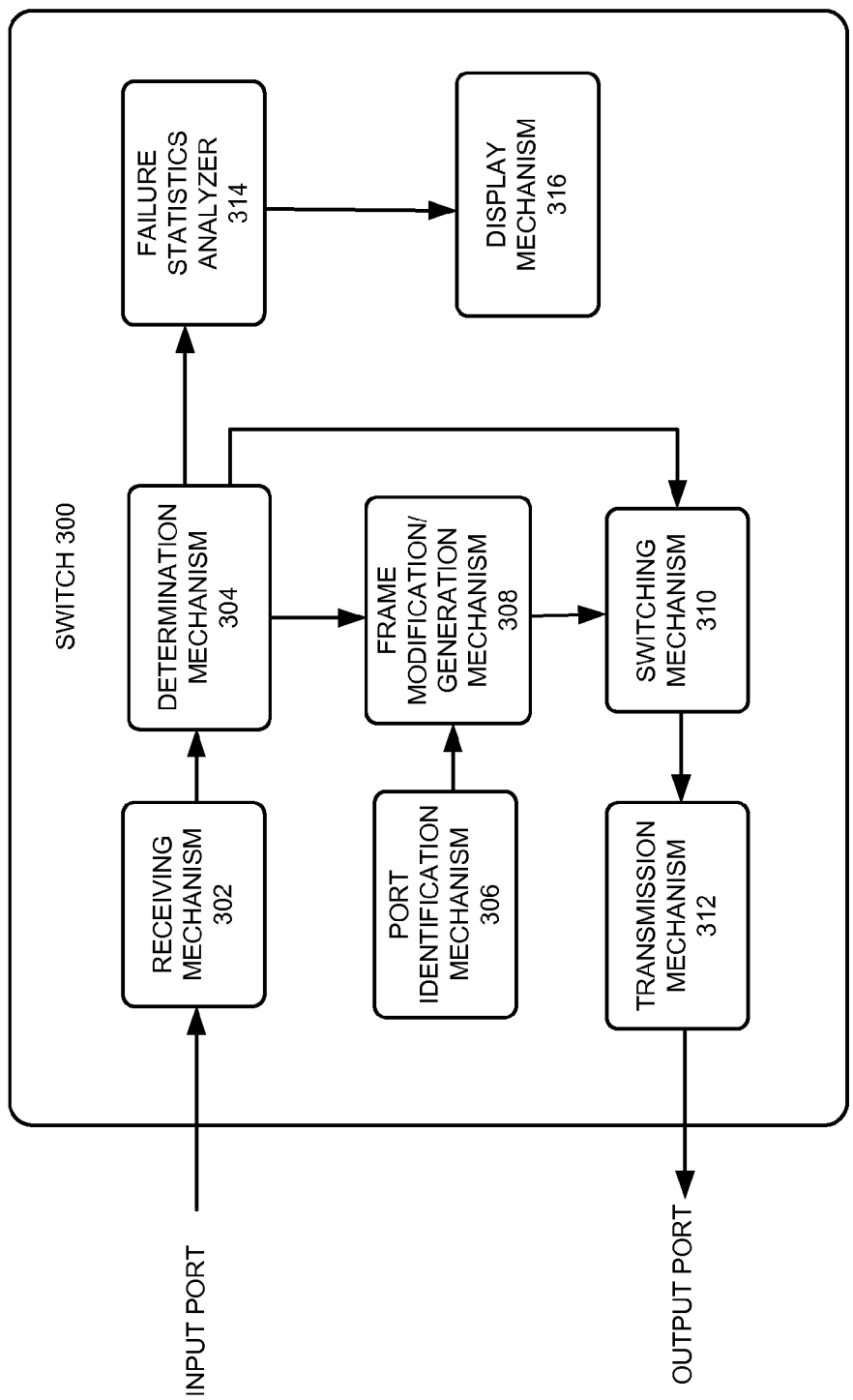
FIG. 3 presents a diagram illustrating an exemplary architecture of a switch enabling the SuperPing function, in accordance with an embodiment of the present invention.

FIG. 3 presents a diagram illustrating an exemplary architecture of a switch enabling the SuperPing function, in accordance with an embodiment of the present invention. Switch 300 includes a receiving mechanism 302, a determination mechanism 304, a port identification mechanism 306, a frame modification/generation mechanism 308, a switching mechanism 310, a transmission mechanism 312, a failure statistics analyzer 314, and a display mechanism 316.

During operation, receiving mechanism 302 receives a frame from the input port, and forwards the received frame to determination mechanism 304. Determination mechanism 304 determines whether the received frame is a management frame corresponding to a previously sent Echo frame. If the received frame is a management frame, it is sent to frame modification/generation mechanism 308. Frame modification/generation mechanism 308 modifies the received management frame's payload using information obtained from port identification mechanism 306, which identifies all possible output ports based on the destination of the previously sent Echo frame. Note that if switch 300 is the source switch, then frame modification/generation mechanism 308 generates an Echo frame and subsequently a management frame in response to a command executing the SuperPing function. The Echo frame is sent directly to the destination node, whereas the management frame is sent to switching mechanism 310, which determines an output port of the Echo frame based on a hash of the Echo frame's header information and switches the management frame to that output port as if following the Echo frame. The management frame is then transmitted by transmission mechanism 312 via the corresponding output port. Also note that if switch 300 is the destination switch, it receives the Echo frame through switch hardware and sends the LS_ACC frame to the source node. When switch 300, as the destination switch, receives the corresponding management frame, frame modification/generation mechanism 308 generates a response management frame by copying the payload of the management frame, and sends the response management frame back to the source switch via switching mechanism 310 and transmission mechanism 312.

If determination mechanism 304 determines that the received management frame is a response to a previously sent management frame corresponding to an Echo frame, and is not destined to switch 300, the received response management frame is sent to switching mechanism 310 and transmission mechanism 312 for transmission back to the source node. If the received response management frame is destined to switch 300, it is sent to failure statistics analyzer 314, which analyzes the payload of the response management frame to compute failure statistics. The failure statistics is subsequently sent to display mechanism 316 for displaying to the user.

Figure 4:
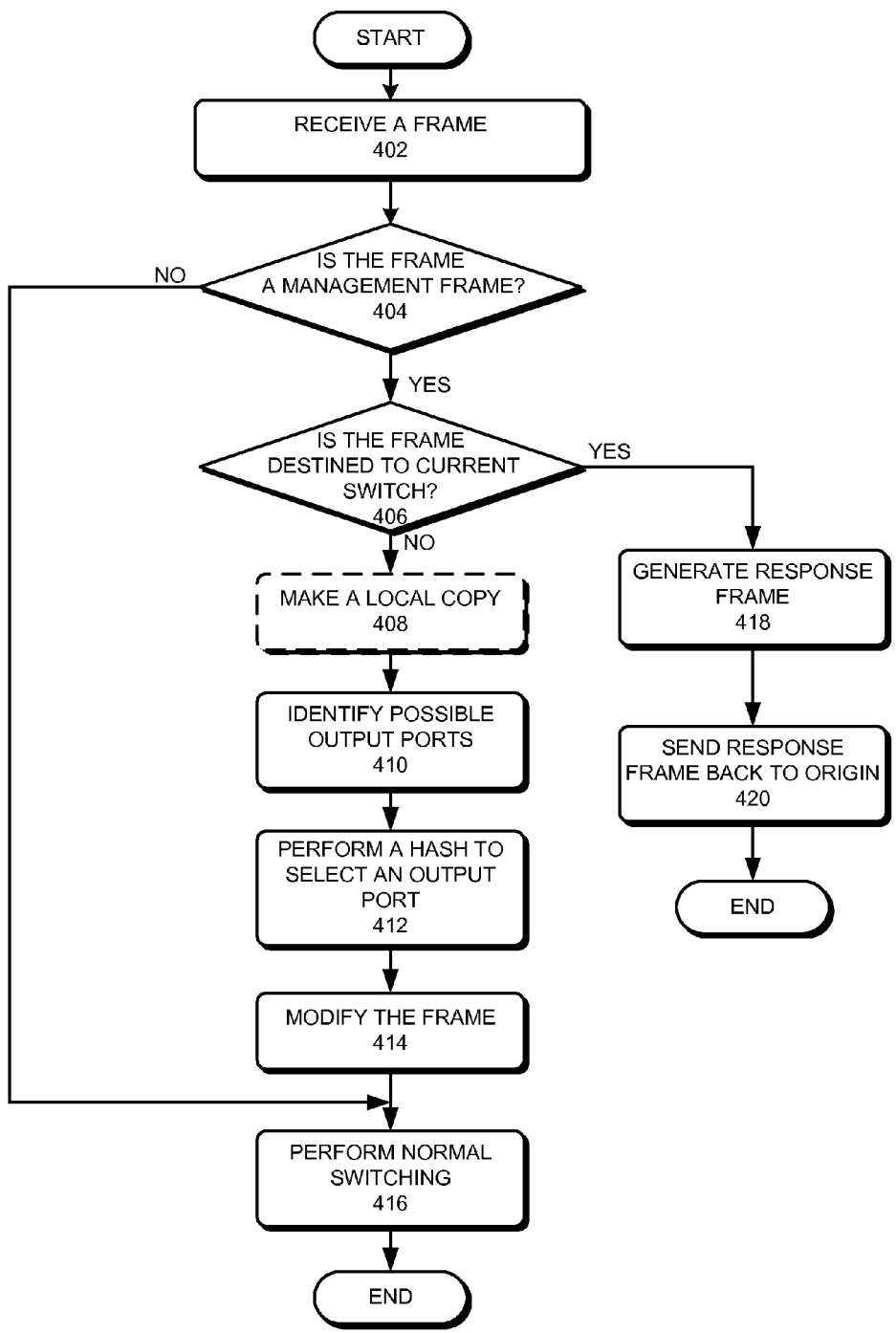
FIG. 4 presents a flowchart illustrating the process of a management frame passing through a SuperPing-enabled switch, in accordance with an embodiment of the present invention.

FIG. 4 presents a flowchart illustrating the process of a management frame passing through a SuperPing-enabled switch, in accordance with an embodiment of the present invention. During operation, an intermediate switch receives a frame (operation 402), and determines whether the received frame is a management frame for link failure diagnosis (operation 404). If not, the switch performs normal switching of the received frame (operation 416). If, however, the received frame is a management frame for link failure diagnosis the switch further determines whether itself is the destination of the management frame (operation 406). If not, the switch optionally makes a local copy of the received management frame (operation 408), which can be used to compare with a subsequently received response frame to determine whether the response frame corresponds to this management frame. If a corresponding response frame is received by the intermediate switch, the local copy of the management frame will be deleted. Subsequently, the switch identifies all possible output ports based on the destination address of the received management frame (operation 410), and selects one of the output ports by performing a hash using the Echo frame's header information, which is stored in the payload of the management frame (operation 412). The switch then modifies the payload of the management frame using the identified port information (operation 414), and then switches the modified management frame using a normal switching algorithm (operation 416).

On the other hand, if it is determined that the current switch is the destination of the management frame, the switch generates a response management frame by copying the payload of the received management frame (operation 418). The generated response frame is sent back to the origin of the received management frame along the same path traveled by the received management frame (operation 420).

In addition to covering all possible physical links between a source switch and a destination switch, the SuperPing function also covers different virtual channels (VCs) across all the ISLs. Note that sometimes, although the physical link is working correctly, one or more of the VCs may have resource starvation, or be congested. Consequently, an Echo frame will be dropped by the malfunctioning VC, which will be marked as having failed. Depending on the quality of service (QoS) configuration of the network configurations, the SuperPing function is configured to be exercised on different VCs. For QoS-enabled network configurations, if the SuperPing function is executed for a destination domain, then the SuperPing function can exercise all VCs associated with different QoS priorities that can be mapped to devices coupled to the destination switch. However, if the destination device is specified, the SuperPing function will only exercise the VC (or VCs) that the device is mapped to. For a network configuration that does not enable QoS, if the SuperPing function is executed for a destination domain, all VCs that are mapped to online devices coupled to the destination switch are traversed. If the SuperPing function is executed for a destination device, only one VC that is mapped to this destination device is traversed.

User Interface

Figures 5A, 5B:
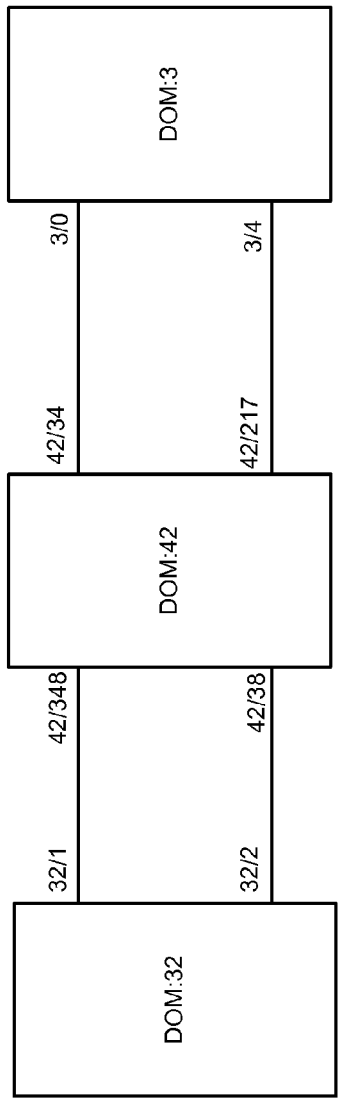
FIG. 5A illustrates an exemplary command line interface that executes the SuperPing function, in accordance with an embodiment of the present invention.
FIG. 5B presents a diagram illustrating an exemplary fabric topology.

A user can use a command line interface (CLI) to execute the SuperPing function. In one embodiment, the system implements SuperPing by adding new options to the conventional FCPing command. FIG. 5A illustrates an exemplary command line that executes the SuperPing function, in accordance with an embodiment of the present invention. In FIG. 5A, the FCPing command is issued with a number of options (including "allpaths," "printisl," "covcount," "maxTries," "errstat," "delay," and "vc") that facilitate SuperPing. The FCPing command can be invoked by providing the port identifier (PID), the World Wide Name (WWN) of the destination port, or the destination domain.

FIG. 5B presents a diagram illustrating an exemplary fabric topology. In FIG. 5B, domain 32 is coupled to domain 42 through 2 ISLs, and domain 42 is coupled to domain 3 through 2 ISLs.

FIG. 5C illustrates an exemplary screenshot showing an FCPing command executed for the topology shown in FIG. 5B with the "allpaths" option and the displayed output, in accordance with an embodiment of the present invention. When FCPing is issued with the "allpaths" option, it will execute the SuperPing command and collect information on all the paths covered. In FIG. 5C, the FCPing command with the "allpaths" option is executed on source domain 32 to destination domain 3. By executing this command, a complete coverage for all the ISLs in the routes between the source (domain 32) and the destination (domain 3) can be achieved.

When SuperPing is executed on domain 32 to domain 3, the system performs the following operations. First, domain 32 sends a number of Echo frames on ISL between port 32/1 and port 42/348. In one embodiment, if the FCPing command does not specify the number of Echo frames, a default value is used. For each Echo frame, the system collects the Echo status (whether a response frame is received) and path information through the subsequent management frames. In the example topology shown in FIG. 5B, there are two paths. These two paths are listed as path 1 and path 2 in the displayed output shown in FIG. 5C. Similarly, by sending Echo frames that traverse the ISL between port 32/2 and port 42/38, the system identifies the other two paths, listed as path 3 and path 4 in the displayed output shown in FIG. 5C. The complete list of paths to the destination is then displayed. Note that in FIG. 5C each hop in a path is represented as: (domain/ingress port, domain/egress port) [FID]. For example, hop (42/348, 42/34) [128] describes a hop at domain 42, with an ingress port of 348 and an egress port of 34; this hop is traversed in the Fabric with an FID of 128. The output for each path also includes path status information indicating whether SuperPing is completed successfully on the path. In the example shown in FIG. 5C, SuperPing is completed successfully on four paths.

FIG. 5D illustrates an exemplary screenshot showing an FCPing command with other options in conjunction with the "allpaths" option and the displayed result, in accordance with an embodiment of the present invention. In FIG. 5D, the FCPing command includes the "printisl" option, which causes the output to display the statistical coverage of each ISL and internal port along the potential paths. In FIG. 5D, in addition to displaying the path information, the output displays the 4 ISLs along with their statistics. The status column represents a status of SUCCESS or FAILURE based on whether there is at least one dropped Echo frame. If all sent Echo frames haven been successfully responded to, the status is SUCCESS, with the numbers in the parentheses representing frames correctly responded to/total frames sent. For example, in FIG. 5D, the status of the first ISL is SUCCESS, with 1000 frames correctly responded to out of 1000 frames sent on this ISL. If some frames sent through an ISL are dropped, the status for the ISL is marked as FAILURE (the number of frames failed/the number of sent frames). In the example shown in FIG. 5D, all ISLs are marked with a status of SUCCESS. In the topology shown in FIG. 5B, there are 8 internal ports (not shown in FIG. 5B) on domain 42 (note that a domain will traverse through internal ports when the ingress port and the egress port exist in different edge chips). Consequently, the output shown in FIG. 5D includes the statistical coverage for all 8 internal ports on domain 42.

In addition to "printisl," in the example shown in FIG. 5D, the FCPing command also includes options "covcount" and "maxTries." The "covcount" option allows a user to specify the minimum number of times each ISL needs to be covered. In one embodiment, the default value of coverage count is set as 5. The "maxTries" option allows a user to specify the maximum number of total frames to be sent. In one embodiment, the default value of "maxTries" is set as 100. In the example shown in FIG. 5D, "-covcount 1000" means that the coverage count parameter is specified as 1000, and "-maxTries 5000" means that the maximum number of total frames is specified as 5000. Accordingly, SuperPing will send 1000 Echo frames at a time and check whether each ISL is covered at least 1000 times. If so, the system stops the test and displays the ISL statistics; otherwise, it will continue to send another 1000 frames until the maximum number of 5000 frames is met before exiting and displaying test status. In other words, it repeats the step of sending 1000 frames 5 times on each egress port. Note that, because the output ports selected by a domain depend on frame parameters that are random for each frame, it is possible that, after sending 5000 frames, not all the ports on an intermediate switch are covered. If not all ISLs are exercised for the specified coverage count, the ISLs within a path beyond an uncovered ISL will not be identified. Consequently, the status of the path is marked as "INCOMPLETE." To achieve completion, the user may need to rerun the test by increasing the "maxTries" parameter. If the coverage count parameter is set as −1 ("-covcount −1"), SuperPing will continually run until it is interrupted by "^C" on the command line. This special option is provided for users to run regression test on all the paths.

When FCPing is executed with the "vc" option, it will exercise all exercisable VCs and display the ISL and internal port statistics per VC so that the user can further isolate the VCs that have resource starvation. When FCPping is executed with the "delay" option, it will induce a delay specified by the followed delay parameter (in milliseconds) between the sequentially sent Echo frames. In addition to the aforementioned options, FCPing can also be executed with the "errstats" option, which will cause the system to collect error statistics of each user port that is part of the ISLs covered by SuperPing to reach the destination domain.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A computer-executed method, comprising:
   determining an output port for a first frame;
   determining a plurality of next-hop nodes based on a destination address carried in a payload of a management frame, wherein the management frame shares the same destination address as the first frame, and wherein the payload of the management frame indicates one next-hop node previously traversed by the first frame;
   selecting one of the plurality of next-hop nodes for transmitting the management frame based on information from the first frame carried in the payload of the management frame; and modifying the payload of the management frame to include information indicating the selected next-hop node and at least one other of the plurality of next-hop nodes, wherein the selected next-hop node is the same next-hop node previously traversed by the first frame.

2. The method of claim 1, wherein the information from the first frame indicates at least one of:
- a source address;
- a destination address;
- a receiving port; and
- an exchange identifier.

3. The method of claim 1, further comprising indicating a respective next-hop node with a Fibre Channel (FC) switch address.

4. The method of claim 3, further comprising transmitting the first frame prior to transmitting the management frame, wherein the first frame is an FC Echo frame;
wherein the payload of the management frame comprises header information of the first frame.

5. The method of claim 1, further comprising generating a response frame corresponding to the management frame.

6. The method of claim 5, wherein the response frame includes a copy of the payload of the modified management frame.

7. The method of claim 1, further comprising:
transmitting a plurality of subsequent management frames with the same destination address in their respective payload via different next-hop nodes.

8. The method of claim 7, further comprising collecting statistics indicating data path health based on response frames received in response to the management frames.

9. The method of claim 1, wherein selecting the next-hop node comprises selecting a virtual channel (VC).

10. A switch, comprising:
- a processor;
- a computer-readable storage medium storing instructions which when executed by the processor causes the processor to perform a method, the method comprising:
  - determining an output port for a first frame;
  - storing in a data structure information which indicates a plurality of next-hop nodes for a destination address carried in a payload of a management frame, wherein the management frame shares the same destination address as the first frame, and wherein the payload of the management frame indicates one next-hop node previously traversed by the first frame;
  - selecting one of the plurality of next-hop nodes for transmitting the management frame based on information from the first frame carried in the payload of the management frame; and
  - modifying the payload of the management frame to include information indicating the selected next-hop node and at least one other of the plurality of next-hop nodes, wherein the selected next-hop node is the same next-hop node previously traversed by the first frame.

11. The switch of claim 10, wherein the information from the first frame indicates at least one of:
- a source address;
- a destination address;
- a receiving port; and
- an exchange identifier.

12. The switch of claim 10, wherein a respective next-hop node is indicated by an FC switch address.

13. The switch of claim 12, wherein the method further comprises transmitting the first frame prior to transmitting the management frame, wherein the first frame is an FC Echo frame; and
wherein the payload of the management frame comprises header information of the first frame.

14. The switch of claim 10, wherein the method further comprises generating a response frame corresponding to the management frame.

15. The switch of claim 14, wherein the response frame includes a copy of the payload of the modified management frame.

16. The switch of claim 10, wherein the method further comprises transmitting a plurality of subsequent management frames with the same destination address in their respective payload via different next-hop nodes.

17. The switch of claim 16, wherein the method further comprises collecting statistics indicating data path health based on response frames received in response to the management frames.

18. The switch of claim 10, wherein while selecting the next-hop node, the method further comprises selecting a VC.

19. A switch means, comprising:
- a determining means for determining an output port for a first frame;
- a storage means for storing information indicating a plurality of next-hop nodes for a destination address carried in a payload of a management frame, wherein the management frame shares the same destination address as the first frame, and wherein the payload of the management frame indicates one next-hop node previously traversed by the first frame;
- a selection means for selecting one of the plurality of next-hop nodes for transmitting the management frame based on information for the first frame carried in the payload of the management frame; and
- a payload modification means for modifying the payload of the management frame to include information indicating the selected next-hop node and at least one other of the plurality of next-hop nodes, wherein the selected next-hop node is the same next-hop node previously traversed by the first frame.

20. The switch means of claim 19, further comprising a generation means for generating a response frame corresponding to the management frame.

* * * * *